H. Whittaker,
Steam-Boiler Fire-Tube.
N° 17,648. Patented June 23, 1857.
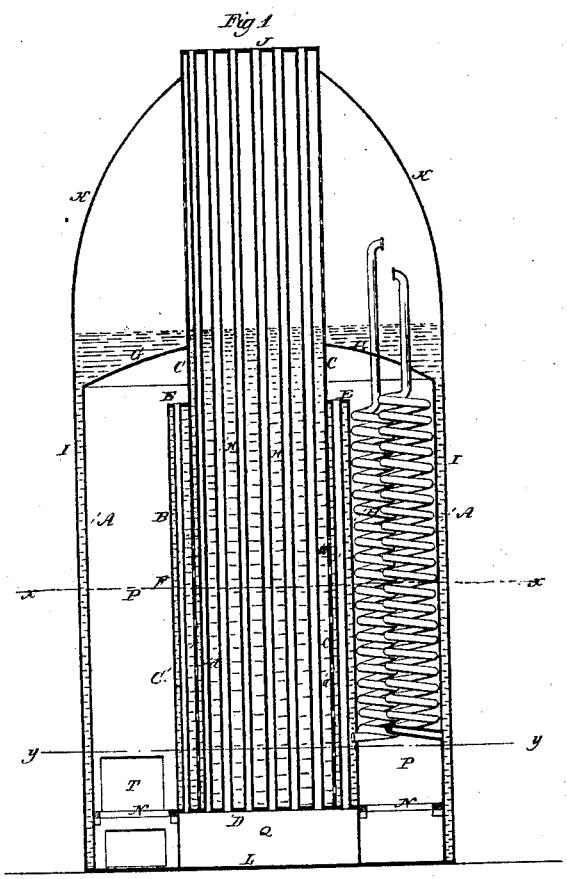
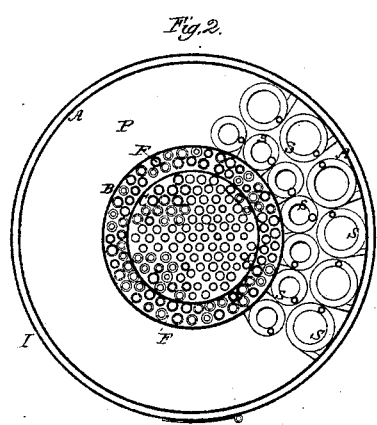
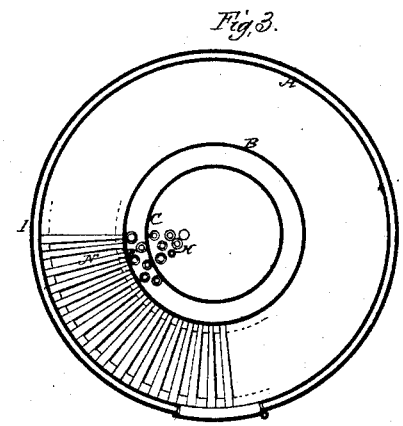
AM. PHOTO-LITHO. CO. N.Y. (OSBORNE'S PROCESS.)

UNITED STATES PATENT OFFICE.

HARRY WHITAKER, OF BUFFALO, NEW YORK.

IMPROVEMENT IN STEAM-BOILERS.

Specification forming part of Letters Patent No. 17,648, dated June 23, 1857.

*To all whom it may concern:*

Be it known that I, HARRY WHITAKER, of the city of Buffalo, in the county of Erie and State of New York, have invented certain new and useful Improvements in Steam-Boilers; and I do hereby declare that the following is full, clear, and exact description of the same, reference being had to the accompanying drawings, making a part of this specification, in which—

Figure 1 is a vertical central section of a boiler with my improvements. Fig. 2 is a horizontal section of the same in the line $x\,x$ of Fig. 1. Fig. 3 is a horizontal section of the same in the line $y\,y$ of Fig. 1.

Similar letters of reference indicate corresponding parts in the several figures.

This invention relates to a certain form and arrangement of the grate, and to certain arrangements of water-spaces, fire-chamber, and fire-tubes for the purpose of obtaining a very great amount of heating-surface with a small body of water, yet providing for the proper circulation of the water, so that no highly-heated part of the boiler shall be left uncovered by water.

To enable others skilled in the art to make and use my invention, I will proceed to describe its construction and operation.

A is an upright cylinder containing another upright cylinder, B, of much smaller diameter, arranged centrally within it, the lower ends of the said cylinders standing in the same horizontal plane, but the upper end of A standing somewhat higher than the upper end of B.

C is a cylinder, of smaller diameter than B, arranged centrally within it, extending from a short distance above the bottom thereof to a considerable distance above the top thereof. The cylinder C is united at its bottom with the cylinder B by a circular tube-sheet, D, and it is united to the top of B by an annular tube-sheet, E. The top of the cylinder A is united with the cylinder C, some distance above the top of the cylinder B, by a crown-sheet, G.

F F are open tubes terminating at one end in the sheet D and at the other in the sheet E.

H H are open tubes extending from the tube-sheet D to a tube-sheet, J, which closes the top of the cylinder C.

I is a cylinder, of a diameter a little larger than the cylinder A, arranged concentrically outside of the latter cylinder. The bottom of this cylinder is on the same level as the bottom of the cylinder A, and its upper end terminates in a dome, K, which unites with the cylinder C.

L is a sheet, of the full size of the cylinder I, closing the bottom of the space between the cylinders I and A, and also closing the bottom of the cylinder B. Instead of this large sheet a sheet may be used to close only the cylinder B, and another to close the space between the cylinders A and I, leaving the space between A and B open at the bottom.

The space surrounding the tubes F F between the cylinders A and C is filled with water, and the space within the cylinder C is filled with water to a level above the crown-plate G. The above-named cylinders, it must be observed, constitute the main body of the boiler, and there is a communication from one to the other through openings $a\,a$ in the sides of the cylinder C. This cylinder C is also perforated above the crown-sheet G, and thus the space within it communicates with the space within the cylinder I, which contains water to the same level as the cylinder C—viz., to some distance above the crown-sheet G. The space between the cylinders A and I constitutes a water-jacket, and the dome K is the steam-chamber. There should be a communication by pipes arranged horizontally or otherwise between the lower part of the water-jacket and the cylinder B, otherwise separate feed-pipes will be required to keep up a proper circulation.

The annular chamber P between the cylinders A and B constitutes the fire-chamber of the boiler and contains an annular fire-grate, N, which surrounds entirely the main body of the boiler. This annular grate may be made stationary to be fed with fuel at two or more doors; or it may be so constructed and arranged as to be capable of rotating so that the whole of it may be fed at one door. The door or doors (of which one is shown at T) will be made through the water-jacket.

The course of the draft (indicated in Fig. 1 by arrows) is as follows: The products of combustion pass upward from the grate to the top of the chamber P, and then descend the tubes F F to the smoke-box Q in the bottom of the cylinder B, from whence they rise through the tubes H H to the chimney, which is placed on the top of the cylinder C. It is clearly shown in the drawings that in no part of the boiler there is any great body of water and that in every part the water is in close contact with part of the heating-surface. Although that is the case, the water-space is so arranged as to provide for a thorough circulation. The arrangement of the fire-chamber and tubes and the great length of circulation provided for the products of combustion insure the ignition and combustion of the inflammable gases or matters that may be evolved from the fire. The tubes passing through the steam-chamber provide for the drying of the steam.

Instead of making the cylinder C extend from near the bottom to the extreme top of the boiler, it needs really only to extend from the annular tube-sheet E to the crown-sheet G, and in that case the upper ends of the tubes H H would be secured in a tube-sheet in the center of the dome K. However, by making the cylinder C of the full height represented it serves to give additional strength to the boiler.

The upper part of the fire-chamber may be filled up with vertical coils of pipe connecting with the water-jacket at the bottom and opening into the steam-chamber at top, as in the boiler of Benjamin Irving, or connecting at the bottom with the cylinder B and opening at top into the steam-chest. S S, Figs. 1 and 2, represent such coils, which may be used or not, as may be desired.

I do not claim, generally, surrounding the fire by a water-jacket. An example may be seen in E. Andrus's withdrawn application, May 27, 1850. Nor do I claim, broadly, to be the first inventor of annular fire-chambers in boilers. Nor do I claim, irrespective of the arrangement I have described, the employment of ascending and descending fire-flues. Examples of such flues may by seen in the withdrawn applications of Thomas Greer, October, 1847, and Thomas E. Warren, July 19, 1852; but the arrangement of flues and parts therewith connected in the above examples is quite different from mine.

What I claim as my invention, and desire to secure by Letters Patent, is—

The arrangement, in an upright cylindrical boiler, of an annular fire-chamber, P, a series of descending fire-tubes, F F, a smoke-box, Q, and a series of ascending fire-tubes, H H, substantially as herein described, to convey the products of combustion from an external fire through the center of the boiler.

HARRY WHITAKER.

Witnesses:
W. TUSCH,
W. HAUFF.